(12) United States Patent
Yang et al.

(10) Patent No.: US 12,089,159 B2
(45) Date of Patent: Sep. 10, 2024

(54) TERMINAL ENERGY-SAVING CONTROL METHOD, APPARATUS AND DEVICE

(71) Applicant: DATANG MOBILE COMMUNICATIONS EQUIPMENT CO., LTD., Beijing (CN)

(72) Inventors: Meiying Yang, Beijing (CN); Fangchen Cheng, Beijing (CN); Jiaqing Wang, Beijing (CN); Chen Luo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 470 days.

(21) Appl. No.: 17/416,387

(22) PCT Filed: Dec. 11, 2019

(86) PCT No.: PCT/CN2019/124502
§ 371 (c)(1),
(2) Date: Jun. 18, 2021

(87) PCT Pub. No.: WO2020/125509
PCT Pub. Date: Jun. 25, 2020

(65) Prior Publication Data
US 2022/0060989 A1 Feb. 24, 2022

(30) Foreign Application Priority Data
Dec. 20, 2018 (CN) .......................... 201811564810.4

(51) Int. Cl.
*H04W 52/02* (2009.01)
*H04L 5/00* (2006.01)
*H04W 72/23* (2023.01)

(52) U.S. Cl.
CPC ....... *H04W 52/0235* (2013.01); *H04L 5/0048* (2013.01); *H04W 72/23* (2023.01)

(58) Field of Classification Search
None
See application file for complete search history.

(56) References Cited

U.S. PATENT DOCUMENTS 11,304,220 B2 * 4/2022 Peng ................. H04W 72/1273
2010/0202384 A1 8/2010 Baker et al.
(Continued)

FOREIGN PATENT DOCUMENTS

CN 103945447 A1 7/2014
CN 107371257 A1 11/2017
(Continued)

OTHER PUBLICATIONS

Huawei, HiSilicon: Power saving techniques, 3GPP TSG RAN WG1 Meeting #95 R1-1812231 Spokane, USA, Nov. 12-16, 2018 (Year: 2018).*

(Continued)

*Primary Examiner* — German Viana Di Prisco
(74) *Attorney, Agent, or Firm* — Ladas & Parry, LLP

(57) ABSTRACT

A terminal energy-saving control method, apparatus and device are provided. The method includes: transmitting energy-saving configuration parameters to a terminal device, wherein the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission; all of the energy-saving configuration parameters are greater than zero, or at least one of the energy-saving configuration parameters is equal to zero.

16 Claims, 2 Drawing Sheets

(56) References Cited

U.S. PATENT DOCUMENTS

| | | | |
|---|---|---|---|
| 2016/0330698 A1 | 11/2016 | Loehr et al. | |
| 2017/0265132 A1 | 9/2017 | Elsayed et al. | |
| 2017/0332397 A1 | 11/2017 | Li et al. | |
| 2018/0279223 A1 | 9/2018 | Kim et al. | |
| 2019/0053172 A1* | 2/2019 | Kim | H04W 52/50 |
| 2019/0090299 A1* | 3/2019 | Ang | H04W 52/0229 |
| 2019/0174518 A1* | 6/2019 | Jiang | H04W 72/1268 |
| 2019/0245648 A1 | 8/2019 | Jo et al. | |
| 2019/0268971 A1* | 8/2019 | Talarico | H04W 76/27 |
| 2020/0022158 A1 | 1/2020 | Peng et al. | |
| 2020/0235885 A1 | 7/2020 | Su et al. | |
| 2021/0321446 A1* | 10/2021 | Lee | H04W 72/54 |
| 2021/0400580 A1* | 12/2021 | Maleki | H04W 52/0216 |

FOREIGN PATENT DOCUMENTS

| | | |
|---|---|---|
| CN | 108365928 A | 8/2018 |
| CN | 108605289 A | 9/2018 |
| CN | 108737311 A | 11/2018 |
| CN | 108933648 A | 12/2018 |
| JP | 2015195589 A | 11/2015 |
| WO | 2014165400 A1 | 10/2014 |
| WO | 2018171700 A1 | 9/2018 |
| WO | 2018204845 A1 | 11/2018 |
| WO | 2018222001 A2 | 12/2018 |
| WO | 2018222099 A1 | 12/2018 |
| WO | 2019112947 A1 | 6/2019 |

OTHER PUBLICATIONS

Ericsson: Triggers of NR UE power saving, 3GPP TSG RAN WG1 Meeting #95 R1-1813183 Spokane, USA, Nov. 12-16, 2018 (Year: 2018).*

First Office Action for Japanese Patent Application 2021-535976 issued by the Japanese Patent Office on Jun. 21, 2022, and Its English Translation provided by Global Dossier.

"UE Adaptation to the Traffic and UE Power Consumption Characteristics," 3GPP TSG-RAN WG1 Meeting #94bis R1-1811282, Oct. 8-12, 2018, Chengdu, China, Agenda item: 7.2.9.2.1, Source: Qualcomm Incorporated, all pages.

"Discussion on minimum K0/K2 indication," 3GPP TSG RAN WG1 #98, R1-1908872, Prague, CZ, Aug. 26-30, 2019, Source: CMCC, Agenda item: 7.2.9.2, all pages.

"UE Power Saving during Active State," 3GPP TSG RAN WG2 NR #99bis, R2-1711904, Prague, Czech, Oct. 9-13, 2017, Revision of R2-1709117, Agenda item: 10.3.1.10, Source: Qualcomm Incorporated, all pages.

European Search Report for European Patent Application 19 90 0678.4, issued Feb. 8, 2022.

"Remaining Issues on DL/UL Resource Allocation" 3GPP TSG-RAN WG1 Meeting #93, R1-1807652, May 21-25, 2018 Busan, Korea Agenda item: 7.1.3.3.1 Source: Qualcomm Incorporated.

"UE Adaptation to the Traffic and UE Power Consumption" 3GPP TSG RAN WG1 Meeting #95, R1-1812824, Spokane, USA, Nov. 12-16, 2018 Agenda item: 7.2.9.2.1 Source: OPPO.

"UE adaptation schemes" 3GPP TSG RAN WG1 Meeting #95, R1-1813011, Spokane, USA, Nov. 12-16, 2018 Agenda item: 7.2.9.2.1 Source: Samsung.

"UE Power Saving during Active State" 3GPP TSG RAN WG2 NR #99bis, R2-1711904, Prague, Czech, Oct. 9-13, 2017 Agenda item: 10.3.1.10 Source: Qualcomm Incorporated.

Second Japanese Office Action for Japanese Patent Application 2021-535976 issued on Nov. 1, 2022 and its English Translation provided by Global Dossier.

"Considerations for soft buffer management," 3GPP TSG RAN WG1 NR Ad-Hoc#2, R1-1711207, Jun. 27-30, 2017, Qingdao, P.R. China, Agenda Item: 5.1.3.3.6.2, Source: Qualcomm Incorporated, all pages.

First Office Action and Search Report from CN app. No. 201811564810.4, dated Nov. 25, 2020, with machine English translation, all pages.

Notification to Grant Patent Right for Invention and supplemental search report from CN app. No. 201811564810.4, dated May 11, 2021, with English translation from Global Dossier, all pages.

International Search Report from PCT/CN2019/124502, dated Mar. 16, 2020, with English translation from WIPO, all pages.

Written Opinion of the International Searching Authority from PCT/CN2019/124502, dated Mar. 16, 2020, with English translation from WIPO, all pages.

International Preliminary Report on Patentability from PCT/CN2019/124502, dated Jun. 16, 2021, with English translation from WIPO, all pages.

CATT, "Offline Discussion on UE Power Saving Schemes", R1-1814093, 3GPP TSG RAN WG1 Meeting #95, Spokane, USA, Nov. 12-16, 2018, all pages.

Office action from corresponding European Patent Application No. 19900678.4 dated Mar. 13, 2024.

* cited by examiner transmitting energy-saving configuration parameters to a terminal device, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset between the physical downlink control channel transmission and an aperiodic channel state indication reference signal transmission; all of the energy-saving configuration parameters are greater than zero, or at least one of the energy-saving configuration parameters is equal to zero ⸺ 101

Fig.1 receiving energy-saving configuration parameters transmitted by a network device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset between the physical downlink control channel transmission and an aperiodic channel state indication reference signal transmission; all of the energy-saving configuration parameters are greater than zero, or at least one of the energy-saving configuration parameters is equal to zero ⸺ 201

Fig.2

TERMINAL ENERGY-SAVING CONTROL METHOD, APPARATUS AND DEVICE

CROSS-REFERENCE TO RELATED APPLICATIONS

The present application is the U.S. national phase of PCT Application PCT/CN2019/124502 filed on Dec. 11, 2019, which claims a priority to the Chinese patent application No. 201811564810.4 filed in China on Dec. 20, 2018, the disclosures of which are incorporated herein by reference in their entireties.

TECHNICAL FIELD

The present disclosure relates to the field of communication technology, in particular to a terminal energy-saving control method, apparatus and device.

BACKGROUND

With the development of wireless communication systems, terminal types and service types are diversified, and there are concurrent demands for power-efficiency, network resource conservation and provision of various service types in terminals. It is discussed and agreed in the RAN1 #95 meeting that, for a cross-slot scheduling, a terminal may switch to a micro sleep mode after receiving a physical downlink control channel (PDCCH) in a case that K0>0 and aperiodic channel state indication reference signal (A-CSI-RS) triggering offset is greater than 0, i.e., if there is no physical downlink shared channel (PDSCH) and channel state indication reference signal (CSI-RS) to receive in the same slot, thus the power consumption of user equipment (UE) is reduced.

Based on protocols in the related art, factors in whether there is data to transmit in the same slot include K1, K2, periodic channel tracking, CSI-RS measurement and periodic radio resource management (RRM) measurement, in addition to a K0 configuration. The parameter K0 represents a slot offset between a PDCCH transmission and a PDSCH transmission, the parameter K1 represents a slot offset between a PDSCH transmission and an acknowledgement (ACK) feedback, and the parameter K2 represents a slot offset between a PDCCH transmission and a physical uplink shared channel (PUSCH) transmission. A value of K0 is 0 (which is a default value when K0 is not configured), 1, 2 or 3. K2 is configured to 0, 1, 2, 3, 4, 5, 6 or 7. K1 is configured to a value in the range of 0, . . . , 15. The A-CSI-RS triggering offset is a slot offset between a PDCCH transmission and an A-CSI-RS transmission, and is configured to 0, 1, 2, 3 or 4.

UE does not know whether the PDSCH needs to be buffered in the same slot, until K0 and K2 are obtained from received and demodulated PDCCH. The configuration of K1 is based on higher layer signaling, and can be changed semi-statically. The A-CSI-RS triggering offset is also configured at a higher layer, and can be changed semi-statically. From the perspective of terminal energy-saving, the four parameters, namely, K0, K1, K2 and A-CSI-RS triggering offset, have to be configured collectively to certain values to achieve the energy-saving effect. For example, when K0>0, UE may enter micro sleep; however, if K2=0 at this time, since the transmission of PUSCH and the reception of PDCCH occur in the same slot, at least the radio frequency transmitter component and baseband component of UE cannot be turned off, that is, the UE is not allowed to enter the micro sleep mode; similarly, if A-CSI-RS triggering offset=0, the UE is also not allowed to enter the micro sleep mode.

SUMMARY

The present disclosure is directed to a terminal energy-saving control method, apparatus and device, to solve the problem that parameters in the related art cannot meet application requirements and cannot achieve terminal energy-saving.

To solve the problem, the present disclosure provides a terminal energy-saving control method. The method is applied to a network device, and includes:

transmitting energy-saving configuration parameters to a terminal device, wherein,
the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;
all of the energy-saving configuration parameters are greater than zero, or at least one of the energy-saving configuration parameters is equal to zero.

The transmitting the energy-saving configuration parameters to the terminal device includes:
determining a service requirement according to a service request reported by the terminal device;
transmitting the energy-saving configuration parameters, of which all parameters are greater than zero, to the terminal device in a case that the service requirement meets a first preset condition;
transmitting the energy-saving configuration parameters, of which at least one parameter is equal to zero, to the terminal device in a case that the service requirement meets a second preset condition,
wherein,
the first preset condition includes at least one of:
a latency is inferior to a preset latency threshold;
a quality of service is inferior to a preset quality of service threshold;
a service priority is inferior to a preset service priority threshold;
a service type is a first preset type,
wherein,
the second preset condition includes at least one of:
the latency is superior or equal to a preset latency threshold;
the quality of service is superior or equal to a preset quality of service threshold;
the service priority is superior or equal to a preset service priority threshold;
the service type is a second preset type.

The transmitting the energy-saving configuration parameters to the terminal device includes:
determining a current slot status;
transmitting the energy-saving configuration parameters, of which all parameters are equal to zero, to the terminal device in a case that the current slot status meets a third preset condition;
transmitting the energy-saving configuration parameters, of which all parameters are greater than zero, to the terminal device in a case that the current slot status meets a fourth preset condition, wherein, the third preset condition includes at least one of:

a current slot is in a channel state information measurement period;

the current slot is a synchronization broadcast signal transmission slot;

the current slot is a channel tracking reference signal transmission slot;

the current slot is in a radio resource management measurement period, wherein, the fourth preset condition is: the current slot is not in a channel state information measurement period, is not a synchronization broadcast signal transmission slot, is not a channel tracking reference signal transmission slot and is not in a radio resource management measurement period.

The transmitting the energy-saving configuration parameters to the terminal device includes:

transmitting the energy-saving configuration parameters through radio resource control signaling; or transmitting the energy-saving configuration parameters through physical downlink control channel signaling; or transmitting the energy-saving configuration parameters through medium access control signaling.

The transmitting the energy-saving configuration parameters to the terminal device includes:

transmitting the energy-saving configuration parameters to the terminal device in form of at least one set.

To solve the problem, the present disclosure provides a terminal energy-saving control method. The method is applied to a terminal device, and includes:

receiving energy-saving configuration parameters transmitted by a network device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero.

The receiving the energy-saving configuration parameters transmitted by the network device includes:

receiving the energy-saving configuration parameters through radio resource control signaling; or receiving the energy-saving configuration parameters through physical downlink control channel signaling; or receiving the energy-saving configuration parameters through medium access control signaling.

The receiving the energy-saving configuration parameters transmitted by the network device includes:

receiving the energy-saving configuration parameters transmitted in form of at least one set.

After the receiving the energy-saving configuration parameters transmitted by the network device, the method further includes:

switching from a current energy consumption mode to a first energy consumption mode in a case that all of the energy-saving configuration parameters are greater than zero, wherein the first energy consumption mode has a lower energy consumption than the current energy consumption mode;

switching from the current energy consumption mode to a second energy consumption mode in a case that at least one of the energy-saving configuration parameters is equal to zero, wherein the second energy consumption mode has a higher energy consumption than the current energy consumption mode.

To solve the problem, the present disclosure provides a network device, including a transceiver, a storage, a processor and a computer program stored in the storage and executable by the processor; wherein, the transceiver is configured to transmit energy-saving configuration parameters to a terminal device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission triggering;

all of the energy-saving configuration parameters are greater than zero, or at least one of the energy-saving configuration parameters is equal to zero.

The transceiver is further configured to:

determine a service requirement according to a service request reported by the terminal device;

transmit the energy-saving configuration parameters, of which all parameters are greater than zero, to the terminal device in a case that the service requirement meets a first preset condition;

transmit the energy-saving configuration parameters, of which at least one parameter is equal to zero, to the terminal device in a case that the service requirement meets a second preset condition, wherein, the first preset condition includes at least one of:

a latency is inferior to a preset latency threshold;

a quality of service is inferior to a preset quality of service threshold;

a service priority is inferior to a preset service priority threshold;

a service type is a first preset type, wherein, the second preset condition includes at least one of:

the latency is superior or equal to a preset latency threshold;

the quality of service is superior or equal to a preset quality of service threshold;

the service priority is superior or equal to a preset service priority threshold;

the service type is a second preset type.

The transceiver is further configured to:

determine a current slot status;

transmit the energy-saving configuration parameters, of which all parameters are equal to zero, to the terminal device in a case that the current slot status meets a third preset condition;

transmit the energy-saving configuration parameters, of which all parameters are greater than zero, to the terminal device in a case that the current slot status meets a fourth preset condition, wherein, the third preset condition includes at least one of:

a current slot is in a channel state information measurement period;

the current slot is a synchronization broadcast signal transmission slot;

the current slot is a channel tracking reference signal transmission slot;

the current slot is in a radio resource management measurement period, wherein, the fourth preset condition is: the current slot is not in a channel state information measurement period, is not a synchronization broadcast signal transmission slot, is not a channel tracking reference signal transmission slot and is not in a radio resource management measurement period.

The transceiver is further configured to:

transmit the energy-saving configuration parameters through radio resource control signaling; or transmit the energy-saving configuration parameters through physical downlink control channel signaling; or transmit the energy-saving configuration parameters through medium access control signaling.

The transceiver is further configured to:

transmit the energy-saving configuration parameters to the terminal device in form of at least one set.

To solve the problem, the present disclosure provides a terminal device, including a transceiver, a storage, a processor and a computer program stored in the storage and executable by the processor; wherein, the transceiver is configured to receive energy-saving configuration parameters transmitted by a network device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero.

The transceiver is further configured to:

receive the energy-saving configuration parameters through radio resource control signaling; or receive the energy-saving configuration parameters through physical downlink control channel signaling; or receive the energy-saving configuration parameters through medium access control signaling.

The transceiver is further configured to:

receive the energy-saving configuration parameters transmitted in form of at least one set.

The processor is configured to:

switch from a current energy consumption mode to a first energy consumption mode in a case that all of the energy-saving configuration parameters are greater than zero, wherein the first energy consumption mode has a lower energy consumption than the current energy consumption mode;

switch from the current energy consumption mode to a second energy consumption mode in a case that at least one of the energy-saving configuration parameters is equal to zero, wherein the second energy consumption mode has a higher energy consumption than the current energy consumption mode.

To solve the problem, the present disclosure provides a terminal energy-saving control apparatus, including:

a transmitting module, configured to transmit energy-saving configuration parameters to a terminal device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission triggering;

all of the energy-saving configuration parameters are greater than zero, or at least one of the energy-saving configuration parameters is equal to zero.

To solve the problem, the present disclosure provides a terminal energy-saving control apparatus, including:

a receiving module, configured to receive energy-saving configuration parameters transmitted by a network device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero.

To solve the problem, the present disclosure further provides a computer readable storage medium storing therein a computer program, wherein the computer program is configured to be executed by a processor, to implement steps of the foregoing terminal energy-saving control method applied to a network device.

To solve the problem, the present disclosure further provides a computer readable storage medium storing therein a computer program, wherein the computer program is configured to be executed by a processor, to implement steps of the foregoing terminal energy-saving control method applied to a terminal device.

The foregoing technical solutions of the present disclosure have the following beneficial effects: according the methods of the present disclosure, at least two parameters of K0, K2, A-CSI-RS triggering offset are transmitted to the terminal device as the energy-saving configuration parameters, and all of the energy-saving configuration parameters are greater than zero or at least one of the energy-saving configuration parameters is equal to zero, thus, the terminal device may directly receive the energy-saving configuration parameters and timely switch to a corresponding energy-consumption mode, so as to achieve a more efficient energy-saving control.

BRIEF DESCRIPTION OF THE DRAWINGS

FIG. 1 is a schematic flow diagram of a terminal energy-saving control method applied to a network device according to some embodiments of the present disclosure;

FIG. 2 is a schematic flow diagram of a terminal energy-saving control method applied to a terminal device according to some embodiments of the present disclosure;

DETAILED DESCRIPTION

Figure 3:
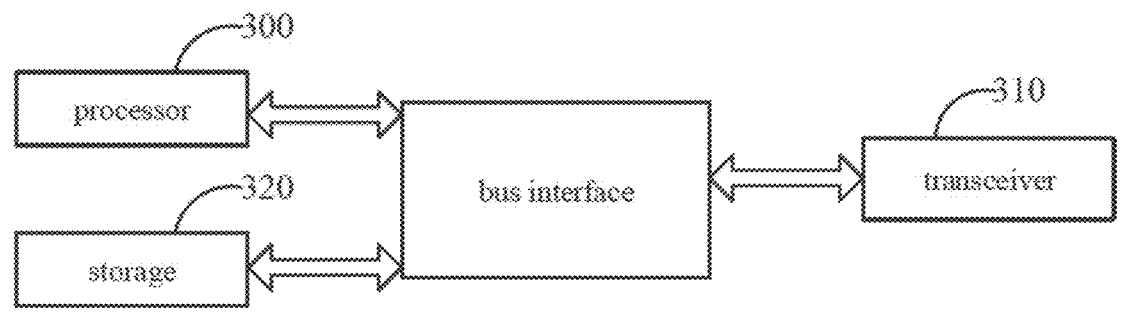
FIG. 3 is a schematic structural diagram of a network device according to some embodiments of the present disclosure.

To describe the technical problem to be solved, the technical solutions and the advantages of the present disclosure more clearly, specific embodiments are described in detail hereinafter with reference to the accompanying drawings.

As shown in FIG. 1, a terminal energy-saving control method according to some embodiments of the present disclosure is applied to a network device and includes a step 101.

Step 101, transmitting energy-saving configuration parameters to a terminal device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero.

With the step 101, a network device (e.g., a base station), to which the terminal energy-saving control method according to some embodiments of the present disclosure is applied, transmits at least two parameters of K0, K2, A-CSI-RS triggering offset to the terminal device as the energy-saving configuration parameters, and all of the energy-saving configuration parameters are greater than zero or at least one of the energy-saving configuration parameters is equal to zero, thus, the terminal device may directly receive the energy-saving configuration parameters and timely switch to a corresponding energy-consumption mode, so as to achieve a more efficient energy-saving control.

It is further understood, a slot offset K1 between a physical downlink shared channel transmission and an ACK feedback may also be transmitted as an energy-saving configuration parameter from the network device to the terminal device. Moreover, K1 and K0 have a certain mapping relationship therebetween (e.g., after a value of K0 is determined, a value of K1 may be determined accordingly, or, the base station configures K0 and K1 according to service requirements such as service type and latency). As a result, K1 is not limited in the embodiment.

In the embodiment, in order to be used in conventional scenarios, on one hand, optionally, the step 101 includes:

determining a service requirement according to a service request reported by the terminal device;

transmitting the energy-saving configuration parameters, of which all parameters are greater than zero, to the terminal device in a case that the service requirement meets a first preset condition;

transmitting the energy-saving configuration parameters, of which at least one parameter is equal to zero, to the terminal device in a case that the service requirement meets a second preset condition, wherein, the first preset condition includes at least one of:

a latency is inferior to a preset latency threshold;

a quality of service is inferior to a preset quality of service threshold;

a service priority is inferior to a preset service priority threshold;

a service type is a first preset type, wherein, the second preset condition includes at least one of:

the latency is superior or equal to a preset latency threshold;

the quality of service is superior or equal to a preset quality of service threshold;

the service priority is superior or equal to a preset service priority threshold;

the service type is a second preset type.

Here, a network device, to which the terminal energy-saving control method according to some embodiments of the present disclosure is applied, configures corresponding energy-saving configuration parameters based on the service requirement according to the service request of the terminal device. Specifically, the service requirement may include a service type requirement, a latency requirement, a quality of service (QoS) requirement, a service priority (Quality of service Class Identifier, QCI) requirement and the like. In this way, if at least one of following conditions is met: the service type is a first preset type (e.g., non-real-time network communication), the latency is inferior to a preset latency threshold, the QoS is inferior to a preset QoS threshold, or the QCI is inferior to a preset service priority threshold, then the energy-saving configuration parameters, of which all parameters are greater than zero, may be transmitted to the terminal device, such that the terminal device switches from a current energy consumption mode to an energy-saving mode with less energy consumption; if at least one of following conditions is met: the service type is a second preset type (e.g., real-time network communication), the latency is superior or equal to a preset latency threshold, the QoS is superior or equal to a preset QoS threshold, or the QCI is superior or equal to a preset service priority threshold, then the energy-saving configuration parameters, of which at least one parameter is equal to zero, may be transmitted to the terminal device, such that the terminal device switches from the current energy consumption mode to a mode with higher energy consumption. The service requirement on which the parameters configuration is based, which is directed to the service request reported by the terminal device, may be a service requirement of the network device, or a service requirement of the terminal device.

For example, the configuration, by the base station, of energy-saving configuration parameters may be based on at least one of a service type, a latency requirement, a QoS requirement or a QCI indication of the base station, or may be based on a service type and/or QoS requirement of the terminal device. Specifically, if the service has a low requirement on the latency, QoS or QCI, all configured energy-saving configuration parameters are greater than zero, and then the terminal device may switch to an energy-saving mode with less energy consumption; if the service has a high requirement on the latency, QoS or QCI, at least one of configured energy-saving configuration parameters is equal to zero, and then the terminal may switch to a mode with higher energy consumption. If the terminal device performs PDCCH reception in the current energy consumption mode, then the switching to the energy-saving mode may include: turning off some of components of the terminal device or entering a sleep mode of the terminal device, to reduce power consumption; the switching to a mode with higher energy consumption may lead to: a power consumption of receiving PDSCH, a power consumption of transmitting PUSCH, or a power consumption of receiving CSI-RS.

On the other hand, the step 101 includes:
determining a current slot status;
transmitting the energy-saving configuration parameters, of which all parameters are equal to zero, to the terminal device in a case that the current slot status meets a third preset condition;
transmitting the energy-saving configuration parameters, of which all parameters are greater than zero, to the terminal device in a case that the current slot status meets a fourth preset condition,
wherein,
the third preset condition includes at least one of:
a current slot is in a channel state information measurement period;
the current slot is a synchronization broadcast signal transmission slot;
the current slot is a channel tracking reference signal transmission slot;
the current slot is in a radio resource management measurement period,
wherein,
the fourth preset condition is: the current slot is not in a channel state information measurement period, is not a synchronization broadcast signal transmission slot, is not a channel tracking reference signal transmission slot and is not in a radio resource management measurement period.

Here, a network device, to which the terminal energy-saving control method according to some embodiments of the present disclosure is applied, configures corresponding energy-saving configuration parameters based on the current slot status. Specifically, the slot status includes: whether the slot is in a channel state information (CSI) measurement period, whether the slot is a synchronization broadcast signal transmission slot, whether the slot is a channel tracking reference signal (TRS) transmission slot, whether the slot is in a radio resource management (RRM) measurement period, and the like. As such, if the current slot status meets at least one condition of: the slot is in a channel state information measurement period, the slot is a synchronization broadcast signal transmission slot, the slot is a channel tracking reference signal transmission slot, or the slot is in a radio resource management measurement period, then the energy-saving configuration parameters, of which all parameters are equal to zero, may be transmitted to the terminal device, such that the terminal device switches from a current energy consumption mode to a mode with higher energy consumption; if the current slot status meets the condition that the slot is not in a channel state information measurement period, is not a synchronization broadcast signal transmission slot, is not a channel tracking reference signal transmission slot and is not in a radio resource management measurement period, then the energy-saving configuration parameters, of which all parameters are greater than zero, may be transmitted to the terminal device, such that the terminal device switches from a current energy consumption mode to an energy-saving mode with less energy consumption.

For example, the configuration, by the base station, of energy-saving configuration parameters may be based on CSI measurement, RRM measurement and channel tracking. Specifically, if the current slot is a time position where periodic CSI and/or RRM measurement is performed, all energy-saving configuration parameters may be configured to be zero, e.g., K0=0, K2=0, A-CSI-RS triggering offset=0, such that the terminal device switches from the current energy-consumption mode to a mode with higher energy consumption; if there is no periodic CSI and RRM measurement and there is no synchronization broadcast signal and channel tracking reference signal to transmit in the current slot, all energy-saving configuration parameters may be configured to be greater than zero, e.g., K0>0, K2>0, A-CSI-RS triggering offset>0, such that the terminal device switches from the current energy-consumption mode to an energy-saving mode with less energy consumption. Similarly, if the terminal device performs PDCCH reception in the current energy consumption mode, then the switching to the energy-saving mode may include: turning off some of components of the terminal device or entering a sleep mode of the terminal device, to reduce power consumption; the switching to a mode with higher energy consumption may lead to: a power consumption of receiving PDSCH, a power consumption of transmitting PUSCH, or a power consumption of receiving CSI-RS.

In the embodiment, optionally, the step 101 includes:
transmitting the energy-saving configuration parameters through radio resource control signaling; or
transmitting the energy-saving configuration parameters through physical downlink control channel signaling; or
transmitting the energy-saving configuration parameters through medium access control signaling.

As such, the configured energy-saving configuration parameters may be transmitted via radio resource control (RRC) signaling, or PDCCH signaling, or medium access control (MAC-CE) signaling. Of course, the specific bearer signaling is not limited thereto. Rather, the same may be implemented with other signaling, which is not enumerated herein.

Further, since the RRC signaling is semi-static, and the PDCCH signaling and the MAC-CE signaling are dynamic, in view of the foregoing configuration manners, to ensure the timely transmission of energy-saving configuration parameters and avoid incurring unnecessary signaling overhead at the same time, for example, the energy-saving configuration parameters configured based on the service requirement are transmitted semi-statically, e.g., through RRC signaling; the energy-saving configuration parameters configured based on the current slot status are transmitted dynamically, e.g., through PDCCH signaling or MAC-CE signaling.

Further, it is noted, in the embodiment, since the energy-saving configuration parameters include at least two of K0, K2, A-CSI-RS triggering offset, the step 101 includes: transmitting the energy-saving configuration parameters to the terminal device in form of at least one set.

As such, the at least two energy-saving configuration parameters may be transmitted in form of a single set. Of course, the at least two parameters may be divided into plural sets and transmitted to the terminal device in one go or in batches.

Generally, the terminal device can acquire the various energy-saving configuration parameters at the latest after the base station transmits the PDCCH. Having acquired the energy-saving configuration parameters, the terminal device may perform corresponding switch of energy consumption modes. Subsequently, the terminal device may receive CSI-RS, TRS, PDSCH, or transmit PUSCH according to configurations. Specifically, the PDSCH or PUSCH is received or transmitted according to PDCCH scheduling information.

In summary, according the terminal energy-saving control method according to some embodiments of the present disclosure, at least two parameters of K0, K2, A-CSI-RS triggering offset are transmitted to the terminal device as the energy-saving configuration parameters, and all of the energy-saving configuration parameters are greater than zero or at least one of the energy-saving configuration parameters is equal to zero, thus, the terminal device may directly receive the energy-saving configuration parameters and timely switch to a corresponding energy-consumption mode, so as to achieve a more efficient energy-saving control.

As shown in FIG. 2, some embodiments of the present disclosure provide a terminal energy-saving control method. The method is applied to a terminal device and includes a step 201.

Step 201, receiving energy-saving configuration parameters transmitted by a network device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero.

With the step 201, the terminal device receives the energy-saving configuration parameters configured by the network device, which include at least two parameters of K0, K2, A-CSI-RS triggering offset, and all of the energy-saving configuration parameters are greater than zero or at least one of the energy-saving configuration parameters is equal to zero, so as to switch subsequently to a corresponding energy consumption mode timely and achieve a more efficient energy-saving control.

It is further understood, a slot offset K1 between a physical downlink shared channel transmission and an ACK feedback may also be transmitted as an energy-saving configuration parameter from the network device to the terminal device. Moreover, K1 and K0 have a certain mapping relationship therebetween (e.g., after a value of K0 is determined, a value of K1 may be determined accordingly, or, the base station configures K0 and K1 according to service requirements such as service type and latency). As a result, K1 is not limited in the embodiment.

The receiving the energy-saving configuration parameters transmitted by the network device includes:

receiving the energy-saving configuration parameters through radio resource control signaling; or receiving the energy-saving configuration parameters through physical downlink control channel signaling; or receiving the energy-saving configuration parameters through medium access control signaling.

Here, the corresponding reception is performed based on the signaling by which the network device transmits the energy-saving configuration parameters. For example, the reception is performed through RRC signaling, PDCCH signaling or MAC-CE signaling.

The receiving the energy-saving configuration parameters transmitted by the network device includes:

receiving the energy-saving configuration parameters transmitted in form of at least one set.

In the method embodiment applied to a network device, the at least two energy-saving configuration parameters may be transmitted in form of a single set. Of course, the at least two parameters may also be divided into plural sets and transmitted in one go or in batches. Correspondingly, the terminal device may acquire all energy-saving configuration parameters through a single set, or through one or more reception of plural sets.

It is understood, the terminal device can acquire the various energy-saving configuration parameters at the latest after the base station transmits the PDCCH. Having acquired the energy-saving configuration parameters, the terminal device may perform corresponding switch of energy consumption modes.

After the receiving the energy-saving configuration parameters transmitted by the network device, the method further includes:

switching from a current energy consumption mode to a first energy consumption mode in a case that all of the energy-saving configuration parameters are greater than zero, wherein the first energy consumption mode has a lower energy consumption than the current energy consumption mode;

switching from the current energy consumption mode to a second energy consumption mode in a case that at least one of the energy-saving configuration parameters is equal to zero, wherein the second energy consumption mode has a higher energy consumption than the current energy consumption mode.

Here, the energy consumption mode switch performed by the terminal device according to the configured energy-saving configuration parameters includes: switching from a current energy consumption mode to a first energy consumption mode with less energy consumption in a case that all of the energy-saving configuration parameters are greater than zero; switching from the current energy consumption mode to a second energy consumption mode with higher energy consumption in a case that at least one of the energy-saving configuration parameters is equal to zero.

For example, assuming that the terminal device performs PDCCH reception in the current energy consumption mode, then the switching to the first energy consumption mode may include: turning off some of components of the terminal device or entering a sleep mode of the terminal device, to reduce power consumption; the switching to the second energy consumption mode may lead to: a power consumption of receiving PDSCH, a power consumption of transmitting PUSCH, or a power consumption of receiving CSI-RS.

It is noted, the method is used in conjunction with the foregoing method applied to the network device, to achieve energy-saving control. The implementations of the terminal device in the foregoing method embodiments applied to the network device are applicable to the method, and may achieve the same technical effects.

As shown in FIG. 3, some embodiments of the present disclosure provide a network device. The network device includes: a transceiver 310, a storage 320, a processor 300 and a computer program stored in the storage 320 and executable by the processor 300; wherein, the transceiver 310 is configured to transmit energy-saving configuration parameters to a terminal device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission triggering;

all of the energy-saving configuration parameters are greater than zero, or at least one of the energy-saving configuration parameters is equal to zero.

The transceiver 310 is further configured to:
determine a service requirement according to a service request reported by the terminal device;
transmit the energy-saving configuration parameters, of which all parameters are greater than zero, to the terminal device in a case that the service requirement meets a first preset condition;
transmit the energy-saving configuration parameters, of which at least one parameter is equal to zero, to the terminal device in a case that the service requirement meets a second preset condition,
wherein,
the first preset condition includes at least one of:
a latency is inferior to a preset latency threshold;
a quality of service is inferior to a preset quality of service threshold;
a service priority is inferior to a preset service priority threshold;
a service type is a first preset type,
wherein,
the second preset condition includes at least one of:
the latency is superior or equal to a preset latency threshold;
the quality of service is superior or equal to a preset quality of service threshold;
the service priority is superior or equal to a preset service priority threshold;
the service type is a second preset type.

The transceiver 310 is further configured to:
determine a current slot status;
transmit the energy-saving configuration parameters, of which all parameters are equal to zero, to the terminal device in a case that the current slot status meets a third preset condition;
transmit the energy-saving configuration parameters, of which all parameters are greater than zero, to the terminal device in a case that the current slot status meets a fourth preset condition,
wherein,
the third preset condition includes at least one of:
a current slot is in a channel state information measurement period;
the current slot is a synchronization broadcast signal transmission slot;
the current slot is a channel tracking reference signal transmission slot;
the current slot is in a radio resource management measurement period,
wherein,
the fourth preset condition is: the current slot is not in a channel state information measurement period, is not a synchronization broadcast signal transmission slot, is not a channel tracking reference signal transmission slot and is not in a radio resource management measurement period.

The transceiver 310 is further configured to:
transmit the energy-saving configuration parameters through radio resource control signaling; or
transmit the energy-saving configuration parameters through physical downlink control channel signaling; or
transmit the energy-saving configuration parameters through medium access control signaling.

The transceiver 310 is further configured to:
transmit the energy-saving configuration parameters to the terminal device in form of at least one set.

The transceiver 310 is configured to receive and transmit data under the control of the processor 300. In FIG. 3, a bus architecture may include any number of interconnected buses and bridges, and connects various circuits including one or more processors represented by the processor 300 and storage represented by the storage 320. The bus architecture may also connect various other circuits such as peripherals, voltage regulators and power management circuits, which is well known in the art. Therefore, a detailed description thereof is omitted herein. A bus interface provides an interface. The transceiver 310 may be multiple elements, that is, including a transmitter and a receiver, to allow for communication with various other apparatuses on the transmission medium. The processor 300 is responsible for supervising the bus architecture and normal operation, and the storage 320 may store the data being used by the processor 300 during operation.

The processor 300 is responsible for supervising the bus architecture and normal operation, and the storage 320 may store the data being used by the processor 300 during operation.

The network device according to the embodiment transmits at least two parameters of K0, K2, A-CSI-RS triggering offset to the terminal device as the energy-saving configuration parameters, and all of the energy-saving configuration parameters are greater than zero or at least one of the energy-saving configuration parameters is equal to zero, thus, the terminal device may directly receive the energy-saving configuration parameters and timely switch to a corresponding energy-consumption mode, so as to achieve a more efficient energy-saving control.

Figure 4:
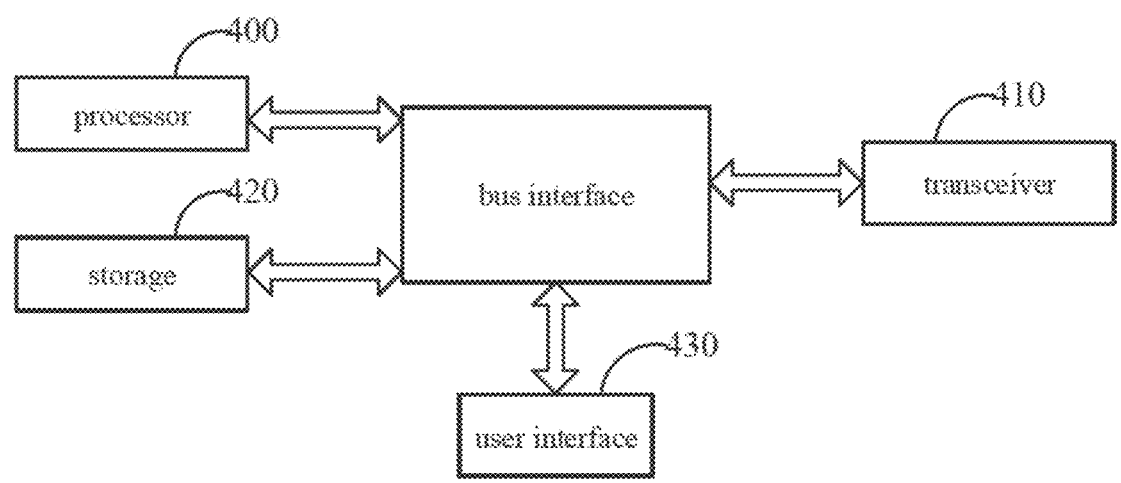
FIG. 4 is a schematic structural diagram of a terminal device according to some embodiments of the present disclosure.

As shown in FIG. 4, some embodiments of the present disclosure provide a terminal device. The terminal device includes: a transceiver 410, a storage 420, a processor 400 and a computer program stored in the storage 420 and executable by the processor 400; wherein, the transceiver 410 is configured to receive energy-saving configuration parameters transmitted by a network device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero.

The transceiver 410 is further configured to:

receive the energy-saving configuration parameters through radio resource control signaling; or receive the energy-saving configuration parameters through physical downlink control channel signaling; or receive the energy-saving configuration parameters through medium access control signaling.

The transceiver 410 is further configured to:

receive the energy-saving configuration parameters transmitted in form of at least one set.

The processor 400 is configured to:

switch from a current energy consumption mode to a first energy consumption mode in a case that all of the energy-saving configuration parameters are greater than zero, wherein the first energy consumption mode has a lower energy consumption than the current energy consumption mode;

switch from the current energy consumption mode to a second energy consumption mode in a case that at least one of the energy-saving configuration parameters is equal to zero, wherein the second energy consumption mode has a higher energy consumption than the current energy consumption mode.

The transceiver 410 is configured to receive and transmit data under the control of the processor 400. In FIG. 4, a bus architecture may include any number of interconnected buses and bridges, and connects various circuits including one or more processors represented by the processor 400 and storage represented by the storage 420. The bus architecture may also connect various other circuits such as peripherals, voltage regulators and power management circuits, which is well known in the art. Therefore, a detailed description thereof is omitted herein. A bus interface provides an interface. The transceiver 410 may be multiple elements, that is, including a transmitter and a receiver, to allow for communication with various other apparatuses on the transmission medium. For different user equipment, the use interface 430 may be an interface capable of externally or internally connecting a required device, and the connected device includes, but is not limited to: a keypad, a monitor, a speaker, a microphone, a joystick and the like.

The processor 400 is responsible for supervising the bus architecture and normal operation, and the storage 420 may store the data being used by the processor 400 during operation.

The terminal device according to the embodiment receives the energy-saving configuration parameters configured by the network device, which include at least two parameters of K0, K2, A-CSI-RS triggering offset, and all of the energy-saving configuration parameters are greater than zero or at least one of the energy-saving configuration parameters is equal to zero, so as to switch subsequently to a corresponding energy consumption mode timely and achieve a more efficient energy-saving control.

Some embodiments of the present disclosure provide a terminal energy-saving control apparatus, including:

a transmitting module, configured to transmit energy-saving configuration parameters to a terminal device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero.

The transmitting module is further configured to:

determine a service requirement according to a service request reported by the terminal device;

transmit the energy-saving configuration parameters, of which all parameters are greater than zero, to the terminal device in a case that the service requirement meets a first preset condition;

transmit the energy-saving configuration parameters, of which at least one parameter is equal to zero, to the terminal device in a case that the service requirement meets a second preset condition, wherein, the first preset condition includes at least one of:

a latency is inferior to a preset latency threshold;

a quality of service is inferior to a preset quality of service threshold;

a service priority is inferior to a preset service priority threshold;

a service type is a first preset type, wherein, the second preset condition includes at least one of:

the latency is superior or equal to a preset latency threshold;

the quality of service is superior or equal to a preset quality of service threshold;

the service priority is superior or equal to a preset service priority threshold;

the service type is a second preset type.

The transmitting module is further configured to:

determine a current slot status;

transmit the energy-saving configuration parameters, of which all parameters are equal to zero, to the terminal device in a case that the current slot status meets a third preset condition;

transmit the energy-saving configuration parameters, of which all parameters are greater than zero, to the terminal device in a case that the current slot status meets a fourth preset condition, wherein, the third preset condition includes at least one of:

a current slot is in a channel state information measurement period;

the current slot is a synchronization broadcast signal transmission slot;

the current slot is a channel tracking reference signal transmission slot;

the current slot is in a radio resource management measurement period, wherein, the fourth preset condition is: the current slot is not in a channel state information measurement period, is not a synchronization broadcast signal transmission slot, is not a channel tracking reference signal transmission slot and is not in a radio resource management measurement period.

The transmitting module is further configured to:

transmit the energy-saving configuration parameters through radio resource control signaling; or transmit the energy-saving configuration parameters through physical downlink control channel signaling; or transmit the energy-saving configuration parameters through medium access control signaling.

The transmitting module is further configured to:

transmit the energy-saving configuration parameters to the terminal device in form of at least one set.

The apparatus transmits at least two parameters of K0, K2, A-CSI-RS triggering offset to the terminal device as the energy-saving configuration parameters, and all of the energy-saving configuration parameters are greater than zero or at least one of the energy-saving configuration parameters is equal to zero, thus, the terminal device may directly receive the energy-saving configuration parameters and timely switch to a corresponding energy-consumption mode, so as to achieve a more efficient energy-saving control.

It is noted, the apparatus is an apparatus in which the foregoing terminal energy-saving control method applied to the network device is applied. The implementations of the embodiment of the terminal energy-saving control method applied to the network device are applicable to the apparatus, and may achieve the same technical effects.

Some embodiments of the present disclosure provide a terminal energy-saving control apparatus, including:

a receiving module, configured to receive energy-saving configuration parameters transmitted by a network device, wherein, the energy-saving configuration parameters include at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero.

The receiving module is further configured to:

receive the energy-saving configuration parameters through radio resource control signaling; or receive the energy-saving configuration parameters through physical downlink control channel signaling; or receive the energy-saving configuration parameters through medium access control signaling.

The receiving module is further configured to:

receive the energy-saving configuration parameters transmitted in form of at least one set.

The apparatus further includes:

a first processing module, configured to switch from a current energy consumption mode to a first energy consumption mode in a case that all of the energy-saving configuration parameters are greater than zero, wherein the first energy consumption mode has a lower energy consumption than the current energy consumption mode;

a second processing module, configured to switch from the current energy consumption mode to a second energy consumption mode in a case that at least one of the energy-saving configuration parameters is equal to zero, wherein the second energy consumption mode has a higher energy consumption than the current energy consumption mode.

The apparatus receives the energy-saving configuration parameters configured by the network device, which include at least two parameters of K0, K2, A-CSI-RS triggering offset, and all of the energy-saving configuration parameters are greater than zero or at least one of the energy-saving configuration parameters is equal to zero, so as to switch subsequently to a corresponding energy consumption mode timely and achieve a more efficient energy-saving control.

It is noted, the apparatus is an apparatus in which the foregoing terminal energy-saving control method applied to the terminal device is applied. The implementations of the embodiment of the terminal energy-saving control method applied to the terminal device are applicable to the apparatus, and may achieve the same technical effects.

Some embodiments of the present disclosure further provide a computer readable storage medium storing therein a computer program, wherein the computer program is configured to be executed by a processor, to implement steps of the foregoing terminal energy-saving control method applied to a network device.

Some embodiments of the present disclosure further provide a computer readable storage medium storing therein a computer program, wherein the computer program is configured to be executed by a processor, to implement steps of the foregoing terminal energy-saving control method applied to a terminal device.

The computer readable storage medium includes permanent and non-permanent, removable and non-removable media, and may achieve information storage by any means or techniques. Information may be computer readable instruction, data structure, program module or other data. Computer storage medium may, for example, include, but is not limited to: phase change random access memory (PRAM), static random access memory (SRAM), dynamic random access memory (DRAM), another type of random access memory (RAM), read-only memory (ROM), electrically erasable programmable read-only memory (EEPROM), flash memory or other memory technologies, compact disc read-only memory (CD-ROM), digital versatile disc (DVD) or other optical storages, cassette tape, magnetic tape, magnetic disk or other magnetic storage device or any other non-transmitting medium, which is configured to store information accessible by a computing device. According to the definition herein, the computer readable medium does not include transitory media, such as modulated data signals and carriers.

It is further noted, many function components described herein are referred to as module, so as to emphasize the independence of their implementation manners.

In some embodiments of the present disclosure, a module may be implemented in software, so as to be executed by various types of processors. For example, an identified executable code module may include one or more physical or logical blocks of computer instructions, e.g., may be built as an object, process or function. Nevertheless, executable codes of the identified module need not to be co-located physically, instead, may include different instructions stored in different locations. When these instructions are combined logically, they constitute the module and fulfill the specified purpose of the module.

In fact, the executable code module may include single instruction or multiple instructions, and may even be distributed over multiple different code segments, distributed over different programs, and distributed across multiple storage devices. In a same way, operation data may be identified within a module, and may be implemented in any suitable manner and organized in any suitable type of data structure. The operation data may be gathered as a single data set or may be distributed over different locations (including different storage devices), and may at least in part reside in a system or on a network as an electronic signal.

When the module may be implemented in software, considering the technological level of hardware process in the related art, if the cost is not taken into account, a person skilled in art may build a hardware circuit corresponding to each module capable of being implemented in software, to achieve corresponding function. The hardware circuit includes conventional very large scale integration (VLSI) circuit or gate array, and a semiconductor in the related art such as a logic chip and transistor, or other discrete component. The module may also be implemented with a programmable hardware device, such as a field programmable gate array, a programmable array logic, a programmable logic device.

The foregoing exemplary embodiments are described with reference to accompanying drawings. Many different forms and embodiments are possible without deviating from the spirit and teaching of the present disclosure. Thus, the present disclosure is not to be construed as a limitation on the exemplary embodiments. Rather, these embodiments are provided so that the present disclosure will be thorough, and will fully convey the scope of the present disclosure to those skilled in the art. In these drawings, the size and relative size of components may be exaggerated for clarity. The terminologies used herein are only for the purpose of describing specific exemplary embodiments, and are not intended to be construed as limitations. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Unless indicated otherwise, a value range in the description include upper and lower limits of the range, as well as any sub-range in the value range.

The foregoing describes some implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A terminal energy-saving control method, applied to a network device, comprising:
   transmitting energy-saving configuration parameters to a terminal device, wherein,
   the energy-saving configuration parameters comprise at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;
   all of the energy-saving configuration parameters are greater than zero, or at least one of the energy-saving configuration parameters is equal to zero;
   wherein the terminal device acquires the energy-saving configuration parameters at the latest after the network device transmits a physical downlink control channel (PDCCH);
   wherein the transmitting the energy-saving configuration parameters to the terminal device comprises:
   determining a current slot status;
   transmitting the energy-saving configuration parameters, of which all parameters are equal to zero, to the terminal device in a case that the current slot status meets a third preset condition;
   transmitting the energy-saving configuration parameters, of which all parameters are greater than zero, to the terminal device in a case that the current slot status meets a fourth preset condition,
   wherein,
   the third preset condition comprises at least one of:
   a current slot is in a channel state information measurement period;
   the current slot is a synchronization broadcast signal transmission slot;
   the current slot is a channel tracking reference signal transmission slot;
   the current slot is in a radio resource management measurement period,
   wherein,
   the fourth preset condition is: the current slot is not in a channel state information measurement period, is not a synchronization broadcast signal transmission slot, is not a channel tracking reference signal transmission slot and is not in a radio resource management measurement period.

2. The terminal energy-saving control method according to claim 1, wherein the transmitting the energy-saving configuration parameters to the terminal device comprises:
   determining a service requirement according to a service request reported by the terminal device;
   transmitting the energy-saving configuration parameters, of which all parameters are greater than zero, to the terminal device in a case that the service requirement meets a first preset condition;
   transmitting the energy-saving configuration parameters, of which at least one parameter is equal to zero, to the terminal device in a case that the service requirement meets a second preset condition,
   wherein,
   the first preset condition comprises at least one of:
   a latency is inferior to a preset latency threshold;
   a quality of service is inferior to a preset quality of service threshold;
   a service priority is inferior to a preset service priority threshold;
   a service type is a first preset type,
   wherein,
   the second preset condition comprises at least one of:
   the latency is superior or equal to a preset latency threshold;
   the quality of service is superior or equal to a preset quality of service threshold;

the service priority is superior or equal to a preset service priority threshold;

the service type is a second preset type.

3. The terminal energy-saving control method according to claim 1, wherein the transmitting the energy-saving configuration parameters to the terminal device comprises:

transmitting the energy-saving configuration parameters through radio resource control signaling; or transmitting the energy-saving configuration parameters through physical downlink control channel signaling; or transmitting the energy-saving configuration parameters through medium access control signaling.

4. The terminal energy-saving control method according to claim 1, wherein the transmitting the energy-saving configuration parameters to the terminal device comprises:

transmitting the energy-saving configuration parameters to the terminal device in form of at least one set.

5. A terminal energy-saving control method, applied to a terminal device, comprising:

receiving energy-saving configuration parameters transmitted by a network device, wherein, the energy-saving configuration parameters comprise at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero;

wherein the terminal device acquires the energy-saving configuration parameters at the latest after the network device transmits a physical downlink control channel (PDCCH);

wherein the receiving the energy-saving configuration parameters transmitted by the network device comprises:

receiving the energy-saving configuration parameters transmitted based on a current slot status by the network device;

wherein, in a case that the current slot status meets a third preset condition, all parameters of the energy-saving configuration parameters are equal to zero;

in a case that the current slot status meets a fourth preset condition, all parameters of the energy-saving configuration parameters are greater than zero;

wherein, the third preset condition comprises at least one of:

a current slot is in a channel state information measurement period;

the current slot is a synchronization broadcast signal transmission slot;

the current slot is a channel tracking reference signal transmission slot;

the current slot is in a radio resource management measurement period, wherein, the fourth preset condition is: the current slot is not in a channel state information measurement period, is not a synchronization broadcast signal transmission slot, is not a channel tracking reference signal transmission slot and is not in a radio resource management measurement period.

6. The terminal energy-saving control method according to claim 5, wherein the receiving the energy-saving configuration parameters transmitted by the network device comprises:

receiving the energy-saving configuration parameters through radio resource control signaling; or receiving the energy-saving configuration parameters through physical downlink control channel signaling; or receiving the energy-saving configuration parameters through medium access control signaling.

7. The terminal energy-saving control method according to claim 5, wherein the receiving the energy-saving configuration parameters transmitted by the network device comprises:

receiving the energy-saving configuration parameters transmitted in form of at least one set.

8. The terminal energy-saving control method according to claim 5, wherein, after the receiving the energy-saving configuration parameters transmitted by the network device, the method further comprises:

switching from a current energy consumption mode to a first energy consumption mode in a case that all of the energy-saving configuration parameters are greater than zero, wherein the first energy consumption mode has a lower energy consumption than the current energy consumption mode;

switching from the current energy consumption mode to a second energy consumption mode in a case that at least one of the energy-saving configuration parameters is equal to zero, wherein the second energy consumption mode has a higher energy consumption than the current energy consumption mode.

9. A terminal device, comprising a transceiver, a storage, a processor and a computer program stored in the storage and executable by the processor; wherein the computer program is configured to be executed by the processor, to implement steps of the terminal energy-saving control method according to claim 5.

10. The terminal device according to claim 9, wherein the transceiver is further configured to:

receive the energy-saving configuration parameters through radio resource control signaling; or receive the energy-saving configuration parameters through physical downlink control channel signaling; or receive the energy-saving configuration parameters through medium access control signaling.

11. The terminal device according to claim 9, wherein the transceiver is further configured to:

receive the energy-saving configuration parameters transmitted in form of at least one set.

12. The terminal device according to claim 9, wherein the processor is configured to:

switch from a current energy consumption mode to a first energy consumption mode in a case that all of the energy-saving configuration parameters are greater than zero, wherein the first energy consumption mode has a lower energy consumption than the current energy consumption mode;

switch from the current energy consumption mode to a second energy consumption mode in a case that at least one of the energy-saving configuration parameters is equal to zero, wherein the second energy consumption mode has a higher energy consumption than the current energy consumption mode.

13. A network device, comprising a transceiver, a storage, a processor and a computer program stored in the storage and executable by the processor; wherein, the transceiver is configured to transmit energy-saving configuration parameters to a terminal device, wherein, the energy-saving configuration parameters comprise at least two of following parameters: a slot offset K0 between a physical downlink control channel transmission and a physical downlink shared channel transmission, a slot offset K2 between the physical downlink control channel transmission and a physical uplink shared channel transmission, and a slot offset A-CSI-RS triggering offset between the physical downlink control channel transmission and an aperiodic channel state indication reference signal transmission;

all of the energy-saving configuration parameters are greater than zero, or at least one of the energy-saving configuration parameters is equal to zero;

wherein the terminal device acquires the energy-saving configuration parameters at the latest after the network device transmits a physical downlink control channel (PDCCH);

wherein the transceiver is further configured to:

determine a current slot status;

transmit the energy-saving configuration parameters, of which all parameters are equal to zero, to the terminal device in a case that the current slot status meets a third preset condition;

transmit the energy-saving configuration parameters, of which all parameters are greater than zero, to the terminal device in a case that the current slot status meets a fourth preset condition, wherein, the third preset condition comprises at least one of:

a current slot is in a channel state information measurement period;

the current slot is a synchronization broadcast signal transmission slot;

the current slot is a channel tracking reference signal transmission slot;

the current slot is in a radio resource management measurement period, wherein, the fourth preset condition is: the current slot is not in a channel state information measurement period, is not a synchronization broadcast signal transmission slot, is not a channel tracking reference signal transmission slot and is not in a radio resource management measurement period.

14. The network device according to claim 13, wherein the transceiver is further configured to:

determine a service requirement according to a service request reported by the terminal device;

transmit the energy-saving configuration parameters, of which all parameters are greater than zero, to the terminal device in a case that the service requirement meets a first preset condition;

transmit the energy-saving configuration parameters, of which at least one parameter is equal to zero, to the terminal device in a case that the service requirement meets a second preset condition, wherein, the first preset condition comprises at least one of:

a latency is inferior to a preset latency threshold;

a quality of service is inferior to a preset quality of service threshold;

a service priority is inferior to a preset service priority threshold;

a service type is a first preset type, wherein, the second preset condition comprises at least one of:

the latency is superior or equal to a preset latency threshold;

the quality of service is superior or equal to a preset quality of service threshold;

the service priority is superior or equal to a preset service priority threshold;

the service type is a second preset type.

15. The network device according to claim 13, wherein the transceiver is further configured to:

transmit the energy-saving configuration parameters through radio resource control signaling; or transmit the energy-saving configuration parameters through physical downlink control channel signaling; or transmit the energy-saving configuration parameters through medium access control signaling.

16. The network device according to claim 13, wherein the transceiver is further configured to:

transmit the energy-saving configuration parameters to the terminal device in form of at least one set.

* * * * *